United States Patent Office 3,551,490
Patented Dec. 29, 1970

3,551,490
METHOD FOR PREPARING TETRAMETHYL-GUANIDINE
Kenneth George Flynn, Bridgewater, N.J., and Dalia Regina Jakas, Norristown, Pa., assignors to American Cyanamid Company, a corporation of Maine
No Drawing. Filed May 21, 1968, Ser. No. 730,900
Int. Cl. C07c 129/08
U.S. Cl. 260—564
3 Claims

ABSTRACT OF THE DISCLOSURE

Dimethylamine hydrochloride and dimethylcyanamide are reacted in the presence of nitrobenzene or isophorone at temperatures of at least about 140° C. for a period of time sufficient to produce tetramethylguanidine. Product yields of 90% or better are obtainable with reaction times of about 4 to 5 hours.

SUMMARY OF THE INVENTION

This invention relates to a novel process for preparing tetramethylguanidine by the reaction of dimethylamine hydrochloride and dimethylcyanamide. More particularly, it relates to a process whereby unexpectedly high yields of tetramethylguanidine are obtainable with short reaction times when the above reaction is carried out in the presence of certain highly selective reaction solvents.

In accordance with the process of this invention, dimethylamine hydrochloride and dimethylcyanamide are brought into reactive contact in the presence of either nitrobenzene or isophorone reaction solvent, or a mixture thereof, at temperatures of at least about 140° C. Under these conditions, yields of tetramethylguanidine of about 25% to about 95% are obtainable with reaction times of about 4 hours, with higher yields obtainable at the higher temperatures.

The unique character of the nitrobenzene and isophorone reaction solvents in assisting the aforementioned reaction is illustrated by the data shown in Table I.

TABLE I.—EFFECT OF DIFFERENT SOLVENTS IN THE REACTION OF DIMETHYLAMINE HYDROCHLORIDE AND DIMETHYLCYANAMIDE TO PRODUCE TETRAMETHYLGUANIDINE

| Solvent | Reaction temperature, °C. | Reaction time, hrs. | Tetramethylguanidine yield, percent |
|---|---|---|---|
| Methylethylketone | 80 | 24 | 0 |
| Ethylphenylether | 172 | 25 | 92 |
| Methylcyanide | 82 | 7 | 0 |
| Cyclohexanone | 156 | 6.5 | 0 |
| n-Butylacetate | 125 | 6.5 | 0 |
| 1,2,4-trichlorobenzene | 150 | 8–11 | 60–90 |
| Chlorobenzene | 132 | 6 | 15 |
| Triethylamine | 90 | 3.5 | 0 |
| Methanol | 15 | 2.5 | 0 |
| Glycerol | 160–175 | 5 | 0 |
| Water | [1] 180 | 10 | 0 |
| Isophorone | 183–185 | 5 | 92.1 |
| Nitrobenzene | 190–195 | 4 | 91.3 |

[1] Under pressure.

Referring to Table I, it can be seen that most solvents employed failed to produce any tetramethylguanidine even when high temperatures were used, as in the case of cyclohexanone, glycerol, and water. Other solvents such as ethylphenylether, trichlorobenzene, and chlorobenzene produced measurable tetramethylguanidine yields, however, both high reaction temperature and extended reaction times were required to achieve these yields. Nitrobenzene and isophorone were the only reaction solvents to produce high yields (90% or better) with short reaction times (about 4 hours). Although a 92% yield of tetramethylguanidine was produced with ethylphenylether reaction solvent, the required reaction time was 25 hours. Trichlorobenzene reaction solvent resulted in tetramethylguanidine yields of 60–90% with reaction times of 8–11 hours; although such reaction times are relatively short, they are still at least about two to three times longer than nitrobenzene or isophorone reaction times. Reductions in reaction time of the magnitude achieved using the present invention are of obvious importance to the economics of tetramethylguanidine manufacture.

It is therefore an object of this invention to provide a means for preparing tetramethylguanidine in high yields with short reaction times.

It is another object of this invention to provide unique and highly selective reaction solvents which enable the preparation of tetramethylguanidine in high yields with short reaction times.

These and other objects of this invention will be apparent from a total reading of this specification.

In carrying out the process of the invention, it is unimportant how reactants dimethylamine hydrochloride and dimethylcyanamide originate in the reaction solvent. For example, they may be added to the solvent separately as distinct chemical species. On the other hand, they may be produced in situ in the solvent by, for example, adding dimethylamine and hydrogen chloride to the solvent in sufficient amount to form the dimethylamine hydrochloride reactant, and by adding cyanogen chloride and dimethylamine to the solvent to form the dimethylcyanamide reactant.

In accordance with the inventive process, tetramethylguanidine is initially formed as tetramethylguanidine hydrochloride which, being insoluble in the reaction mixture, precipitates. The precipitate can be removed by filtration and treated with base to liberate tetramethylguanidine which may then be purified using methods hitherto known. Alternatively, the tetramethylguanidine hydrochloride may be extracted by water from the reaction mixture, treated with base, and purified to yield tetramethylguanidine.

Tetramethylguanidine yield increases as reaction temperature increases. The effect of reaction temperature with nitrobenzene as a reaction solvent is illustrated by the data shown in Table II.

TABLE II.—TEMPERATURE EFFECT IN THE REACTION OF DIMETHYLAMINE HYDROCHLORIDE AND DIMETHYLCYANAMIDE IN NITROBENZENE TO PRODUCE TETRAMETHYLGUANIDINE

| | Reaction time, hrs. | Tetramethylguanidine yield |
|---|---|---|
| Reaction temperature, ° C.: | | |
| 150 | 5 | 26.4 |
| 193 | 4 | 91.3 |
| 200 | 4 | 94 |

Reaction temperature below about 140° C. are usually unavailing due to the low yields obtained. Reaction temperatures of about 185° C. to 200° C. represent a generally preferred range. The reaction may be conveniently carried out at atmospheric pressure and, in fact, use of elevated pressure did not noticeably enhance results. Higher reaction temperatures may, of course, be used at higher pressures provided that the reactants and solvents are thermally stable at these higher temperatures.

Tetramethylguanidine is a commercially available chemical having a wide ranging utility. Perhaps its most prominent use is as a catalyst in the preparation of polyurethane foams. However, it has also been used for level dyeing of nylon, wool, and other proteinaceous materials with milling colors (U.S. Patent 2,900,218); to improve wood durability by destroying thiamine (Forest Products Journal 9, pp. 166–171 [1959]; and as a solvent for titration of various phenols (Talanta 9, pp. 175–177 [1962]).

The following examples are provided to further illustrate the invention.

Example 1.—Preparation of tetramethylguanidine in nitrobenzene reaction solvent

To 40 ml. of nitrobenzene were added 8.8 gms. (0.125 mole) of dimethylcyanamide and 10.3 gms. (0.126 mole) of dimethylamine hydrochloride. The solution was heated to 200° C. and maintained at this temperature for 4 hours. The solution was cooled. A solid weighing 18 gms. was identified as tetramethylguanidine hydrochloride; tetramethylguanidine yield, 94%.

Example 2.—Preparation of tetramethylguanidine in isophorone reaction solvent

The reaction was carried out substantially as shown in Example 1 except that the reaction solvent was isophorone, reaction temperature was 183–185° C. and reaction time was 5 hours. Tetramethyguanidine yield, 92.1%.

We claim:

1. A process for preparing tetramethylguanidine or the hydrochloride salt thereof which comprises bringing into reactive contact dimethylamine hydrochloride and dimethylcyanamide in the presence of a solvent selected from the group consisting of nitrobenzene and isophorone at a temperature of about 185 to about 200° C. for a period of time sufficient to produce tetramethylguanidine.

2. The process of claim 1 wherein the solvent is nitrobenzene.

3. The process of claim 2 wherein the reaction time is at least about 4 hours.

References Cited

UNITED STATES PATENTS 2,666,745   1/1954   Mullen et al. _____ 252—47

OTHER REFERENCES

Backer et al.: Recueil des Travaux Chimiques des Pays-Bas, vol. 66, p. 343 (1947).

BERNARD HELFIN, Primary Examiner

G. A. SCHWARTZ, Assistant Examiner